United States Patent [19]
Franklin
[11] Patent Number: 4,516,182
[45] Date of Patent: May 7, 1985

[54] CURRENT LIMITING APPARATUS

[75] Inventor: LeRoy H. Franklin, Escondido, Calif.
[73] Assignee: GA Technologies Inc., San Diego, Calif.

[21] Appl. No.: 424,839
[22] Filed: Sep. 27, 1982

Related U.S. Application Data

[63] Continuation-in-part of Ser. No. 225,627, Jan. 16, 1981, abandoned.

[51] Int. Cl.³ .............................................. H02H 7/22
[52] U.S. Cl. .......................................... 361/13; 361/8; 361/58; 200/144 AP; 335/16; 335/195
[58] Field of Search ......................... 361/58, 5, 7, 8, 9, 361/10, 11, 13; 200/144 AP, 144 R; 335/6, 16, 195, 147; 337/284, 283, 184

[56] References Cited

U.S. PATENT DOCUMENTS

| | | | |
|---|---|---|---|
| 697,273 | 4/1902 | Plumtree | 361/58 X |
| 1,406,039 | 2/1922 | Lee | 361/58 |
| 1,567,016 | 12/1925 | Traver | 361/58 X |
| 1,866,371 | 7/1932 | Prince | 361/10 X |
| 2,897,408 | 7/1959 | Kesselring | 335/195 X |
| 2,930,870 | 3/1960 | Baer | 335/147 |
| 3,068,379 | 12/1962 | Cole | 317/58 |
| 3,222,479 | 12/1965 | Franklin et al. | 200/120 |
| 3,263,042 | 7/1966 | Dyer | 200/87 |
| 3,317,866 | 5/1967 | Hanafusa | 335/16 |
| 3,343,108 | 9/1967 | Murai | 335/16 |
| 3,469,216 | 9/1969 | Shiraishi | 335/195 |
| 3,522,472 | 8/1970 | Breitholtz | 361/10 X |
| 3,529,210 | 9/1970 | Ito et al. | 361/58 |
| 3,544,843 | 12/1970 | Sletten et al. | 361/104 X |
| 3,663,905 | 5/1972 | Kussy et al. | 335/195 |
| 3,764,946 | 10/1973 | Mostosi | 335/195 |
| 3,815,059 | 6/1974 | Spoelman | 335/195 X |
| 3,824,508 | 7/1974 | Terracol | 335/16 |
| 3,873,854 | 3/1975 | Lamb | 361/58 X |
| 3,927,350 | 12/1975 | McConnell | 361/58 X |
| 4,001,738 | 1/1977 | Terracol et al. | 335/195 X |
| 4,093,968 | 6/1978 | Shirey | 361/58 |
| 4,258,343 | 3/1981 | Kussy | 335/195 X |
| 4,314,300 | 2/1982 | Griffith | 361/13 |

FOREIGN PATENT DOCUMENTS 283069 3/1915 Fed. Rep. of Germany ........ 361/13

OTHER PUBLICATIONS

Fault Currents Limited in T-Line Test; Application Eyed at 345-kV, 765 KV, Electric Light and Power, Dec. 1978.

*Primary Examiner*—Patrick R. Salce
*Attorney, Agent, or Firm*—Fitch, Even, Tabin & Flannery

[57] ABSTRACT

A current limiting apparatus includes bridging electrical contacts forming a first current path across a gap in a conductor, a trigger for breaking said first current path in response to an excessive or rapidly changing level of current on said conductor, a fast acting fuse forming a second current path across said gap, for maintaining a conductive path across said gap for a predetermined length of time after breaking of said first current path, to allow the bridging electrical contacts to separate a sufficient distance from said gap to preclude arcing thereacross, and an auxiliary resistor connected across said gap to provide a relatively high resistance conductive path for current in the conductor after said fuse has blown.

4 Claims, 5 Drawing Figures

CURRENT LIMITING APPARATUS

This is a continuation-in-part of copending application Ser. No. 225,627, filed Jan. 16, 1981, now abandoned.

The present invention relates to means for protecting a high current DC circuit, and more specifically to an apparatus that functions to rapidly increase the resistance of the circuit without breaking the circuit, while also functioning to prevent or suppress arcing.

Means for limiting high AC currents are well known in the art. Means for limiting high DC currents sufficiently rapidly, however, is difficult, since the circuit DC current could double or triple in a few milliseconds (msec). The current limiting apparatus must therefore respond quickly at low or moderate circuit overload. In a typical case, for example, a 700 volt DC supply will operate with a current output normally in the range of 50 kiloamperes (kA). A short circuit may cause the current to increase at a rate of 25 kmsec up to as high as 200 kA. Unless this current is quickly limited, circuit damage from burning caused by excess heat generation is likely. Magnetic forces between adjacent conductors carrying such currents in opposite directions also increase as the square of the current, thereby providing a second probable cause for circuit damage. Existing methods for limiting high DC currents include the use of fuses, circuit breakers and crowbar protective circuits.

The difficulty with most fuses is that they require a high overload current, on the order of 30–50 times the normal circuit current, to blow within one or two milliseconds. This is because the fuses are designed to carry large continuous currents under normal operation, being a series element in the circuit between the power source and the load. Such fuses also are disadvantageous, since they have poor voltage clearing capabilities. Voltage clearing is the process of clearing away conductive matter in the fuse so that arcing is not enabled through the remnant material once the fuse has blown. Fuses that are required to conduct high currents must have a very low resistance to minimize heating and power loss during normal operation. This requires that the fusible element have a large cross section, which does not clear well.

Circuit breakers are also disadvantageous, since they tend to be too slow and may not be capable of breaking circuits having high currents in the range of many kA due to arcing across the breaker contacts, or other problems. Crowbar protective circuits are similarly undesirable, since they add to the overload on the power supply and the power bus during a fault condition. In general, considerations of mountings, lead breakouts, connections, resistance, and space requirements also make such devices poor choices as high power current limiting devices.

In addition, magnetic forces resulting from the high currents in such circuits may affect circuit breaker or crowbar protective current switches adversely. Many switch designs in the prior art do not take into account strong magnetic forces, and thus risk malfunction of the switch.

Arc clearing is a problem with most of these switches, such that auxiliary commutating circuits are usually required. This is because switches that interrupt a circuit suddenly tend to generate high transient voltages which inhibit the suppression of arcing during switch contact opening. These high voltage transients may also cause damage to other parts of the system, e.g., to the power supply insulation.

Accordingly, it is an object of the present invention to provide an apparatus for rapidly increasing the resistance of a high current DC circuit in response to a low or moderate overload, wherein the circuit is not broken and arcing is prevented or suppressed.

A further object of the present invention is to provide a current limiting apparatus having a tripping mechanism sensitive to overcurrent, for causing bridging electrical contacts which bridge a gap in a conductor to break away from contact with the conductor at a response time on the order of a few milliseconds.

Another object of the present invention is to provide a current limiting apparatus in one embodiment that takes advantage of magnetic forces generated by an overcurrent to assist in breaking away bridging electrical contacts from a conductor once a critical current level has been exceeded.

Yet another object of the present invention is to provide a current limiting apparatus wherein a fuse maintains a current path across a gap in a conductor for a predetermined length of time after bridging contacts break away from the gap, to allow such contacts to separate from the conductor far enough to prevent arcing across the gap.

Yet another object of the present invention is to provide a current limiting apparatus wherein sensing of an overcurrent condition is remote from the site where bridging electrical contacts are positioned on a conductor.

Still another object of the present invention is to provide a current limiting apparatus wherein a plurality of current limiting mechanisms may be organized in one or more arrays, to provide protection in circuits of higher voltage or current requirements.

These and other objects and advantages of the present invention will become more apparent upon reference to the following description and accompanying drawings, in which.

Generally, the present invention is directed to a current limiting apparatus comprising bridging electrical contact means for forming a first current path across a gap in a conductor and means for breaking this current path in response to a current in the conductor that exceeds a predetermined value. A fast acting fuse is connected to the conductor in parallel with the bridging electrical contact means on said conductor and operates to maintain current in the conductor over a second current path for a predetermined length of time after the bridging electrical contact means has broken away from the conductor. This is to enable the bridging electrical contact means to have sufficient time to physically move away from the conductor to thereby suppress arcing across the gap. Current limiting conductive means are also provided which are connected to the conductor in parallel with the bridging electrical contact means. The current limiting conductive means provides a higher impedance third current path across the gap after the fuse has "blown". The fast-acting fuse is set to blow at a moderate overload current after a few milliseconds.

Figure 1:
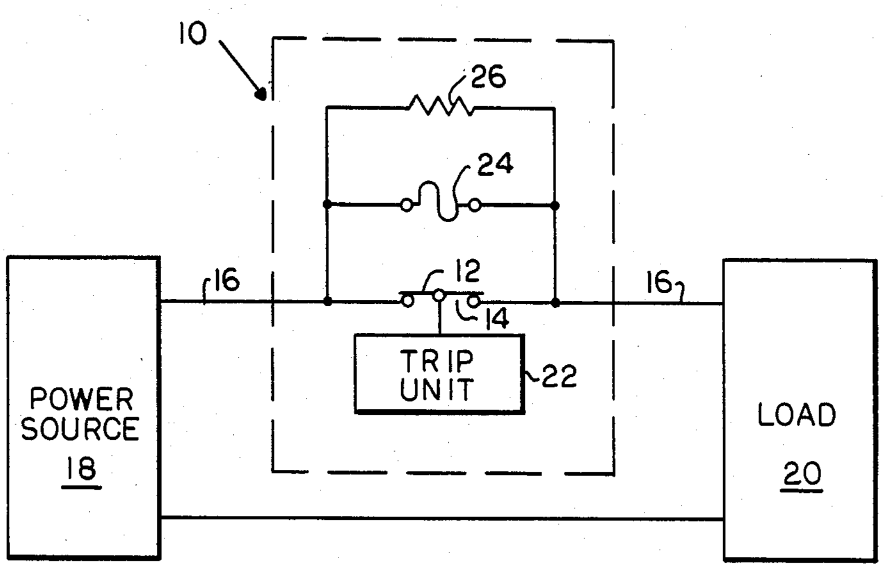
FIG. 1 is a schematic diagram of a current limiting apparatus according to the present invention.

The particular invention may be more clearly understood with reference to the figures, in which FIG. 1 is a schematic diagram of a current limiting apparatus 10 according to the present invention.

As seen in FIG. 1, the current limiting apparatus 10 includes bridging electrical contact means 12 for bridging a gap 14 between two sections of a conductor 16. The current limiting apparatus 10 is positioned on conductor 16 between a power supply or power source 18 and a circuit load 20.

A trip unit 22 provides means for causing the bridging electrical contact means to rapidly break away and separate from conductor 16 in response to the detection of any undesirable change in the state of the current in the conductor. Trip unit 22 thus causes the current path across gap 14 created by the bridging electrical contact means to be eliminated. Connected to conductor 16 across gap 14 in parallel with the bridging electrical contact means 12 are a fast-acting fuse 24 and an auxiliary resistor 26.

In operation, the current limiting apparatus shown in FIG. 1 acts to rapidly increase the resistance of conductor 16, to compensate for a fault or short circuit in the normal circuit load, thereby reducing the maximum level of overload current flowing in the circuit. The current limiting apparatus accomplishes this while preventing or suppressing any arcing across gap 14. The apparatus does not break the circuit, which otherwise would create high voltage transients with their attendant problems.

Specifically, when the overcurrent condition is detected, trip unit 22 causes the bridging electrical contact means 12 to break away from contact with conductor 16 at a rapid rate, e.g. in 1–4 milliseconds. To prevent arcing across gap 14 when the current path formed by the bridging electrical contact means 12 is broken, i.e. to enable the contact means 12 to move sufficiently far away from conductor 16, fast-acting fuse 24 temporarily provides an auxiliary current path across gap 14. During the normal operation of the power circuit, almost all of the current flows across the bridging electrical contact means 12, with only a very small amount of current flowing through fuse 24 and resistor 26. As the contact means 12 breaks away from conductor 16, much more current is transferred across fuse 24. Fuse 24 should have a very low resistance so that the voltage across gap 14 is minimized. The lower the voltage across this gap, the lower the likelihood that arcing across gap 14 will occur. A larger portion of current at this point is also flowing through resistor 26. When fuse 24 subsequently blows after a short time, all of the current is directed through resistor 26. When this occurs, resistor 26 acts as a current limiting conductive means, to limit the current in the circuit by providing an auxiliary load for power source 18. Note that if arcing were allowed to be established across gap 14, resistor 26 would be bypassed, negating its current limiting effect.

The rapidity of response of the current limiting apparatus must be in the range of a few milliseconds, to enable contact opening and insertion of the auxiliary load in the circuit before current on the conductor has exceeded a safe range. Prior art mechanisms, because of linkages, inertial mass, or operating time of a solenoid, for example, tend to be too slow to operate faster than the range of 15 to over 100 milliseconds, with the main switch contacts requiring additional time to open and arcing across the contacts to clear.

Fuse 24 is operative to maintain current in the auxiliary or second current path only for a predetermined few milliseconds of time after breaking of the current path formed by the bridging electrical contact means 12, to enable the contact means 12 to have enough time to physically move away from conductor 16 a sufficient distance to prevent or suppress arcing across gap 14. A time period in the range of 3–4 milliseconds before fuse 24 would blow is believed to be preferred.

Looking in more detail to the construction of the apparatus of the present invention, to achieve the necessary rapid opening, the mass of the contact means 12 must be kept as low as possible while still being of a size that will carry the high currents required during normal operation. Forces used to cause the breaking away of contact means 12 may include mechanical, electromagnetic, and or gravitational forces. Trip unit 22 is also preferably of simple construction and direct acting. Tripping of trip unit 22 may be obtained through the effect of such electromagnatic forces, which may be high during an overcurrent state, or by a remote trigger unit which would electronically sense an overcurrent state. Exemplary trip units 22 are described hereinbelow.

To provide fuse timing, the resistance of the fuse is preset to a value which depends on the amount of current expected across the fuse in an overload condition. For example, if 10 kA are expected to flow through fuse 24 in an overload condition, to keep the voltage across gap 14 at a low level, a resistance of a little less than 1 milliohm across fuse 24 is desired. This resistance needs to include the contact resistance of fuse 24 with conductor 16. This would generate a voltage across gap 14 of approximately 10 volts, which is below the ionization potential of air, and thus within the range needed to inhibit arcing. To minimize fuse 24 contact resistance, it is preferable that the fuse be bolted to the conductor 16. The moderate pressure and large surface contact area thus created between the fuse and the conductor 16 is sufficient to limit this resistance.

Fuse 24 is also designed to properly clear so that no arc is allowed to form across the fuse terminals. Such clearing is obtained with fuses of the type described in U.S. Pat. No. 3,222,479, which blow with the volatization and dispersal of the fuse metal to self clear the fuse between its terminals to prevent arc restrike. The disclosure of U.S. Pat. No. 3,222,479 is hereby incorporated herein by reference. Clearing of fuse 24 is also easier, according to the present invention, since, unlike prior art fuses, fuse 24 is not designed to carry full circuit current during normal circuit operation. It only conducts large currents for a few milliseconds after the bridging electrical contact means 12 has separated from conductor 12.

As will be described in more detail hereinbelow, resistor 26 must be of enough mass to absorb the heat energy generated by the current passing through it. Heat dissipation designs are of lesser importance because there is usually no time for resistor 26 to dissipate the heat during an overcurrent condition. This is because, in a normal power system, after a few tens of milliseconds the power supply protective circuits take over and automatically switch off the main breakers, thereby turning off the current and shutting down the power at the source.

Figure 2:
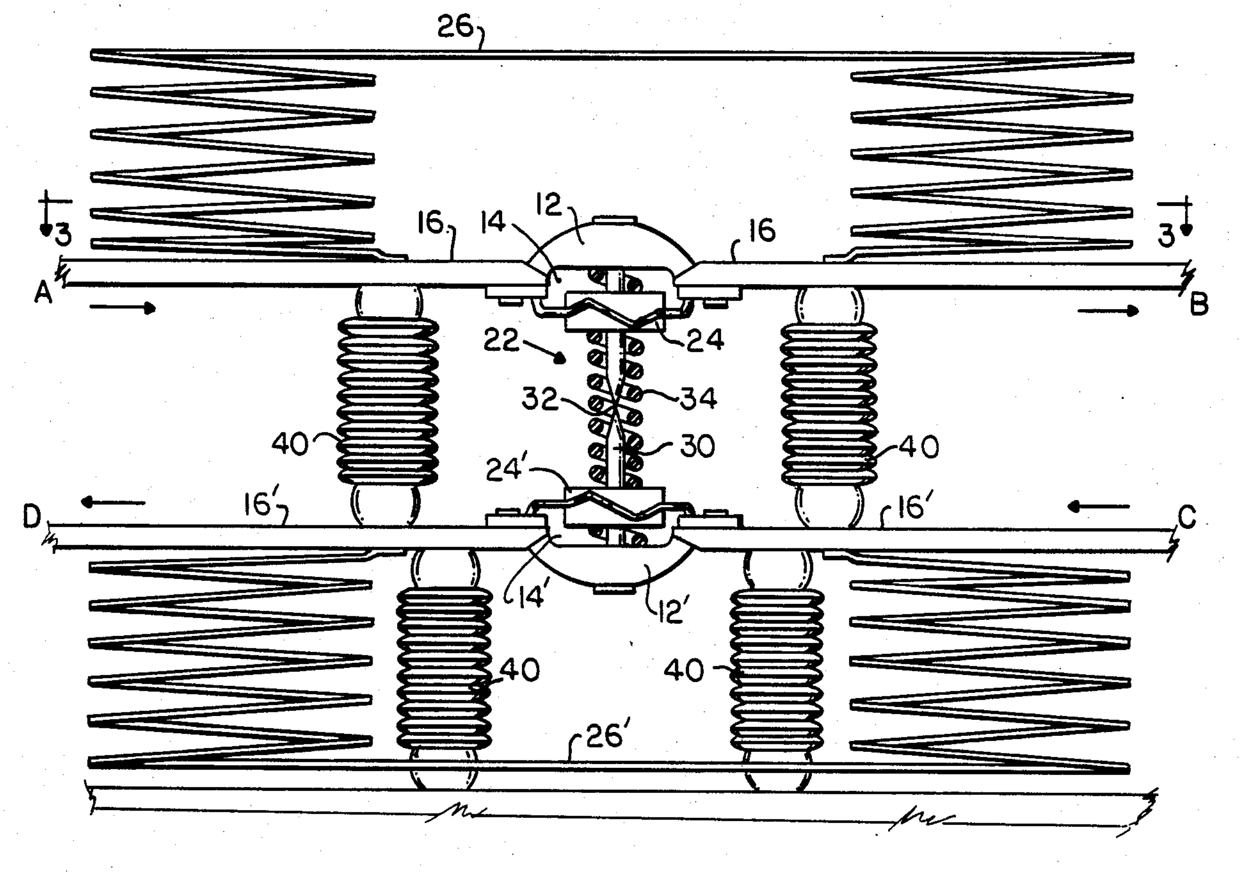
FIG. 2 is a detailed side view of a preferred embodiment of an opposed pair of current limiting devices according to the present invention.

FIG. 2 illustrates a detailed side view of a preferred embodiment of the present invention wherein a pair of current limiting devices are positioned in an opposed relationship. The advantage of this arrangement is that it allows the current limiting devices to take advantage of the electromagnetic repulsion generated by the high currents in adjacent conductors during current overload. Such forces can provide significant assistance in the separation of the bridging electrical contact means 12 from conductor 16. To achieve this result, the current in conductor 16 must be opposite in direction to the current flowing in the adjacent conductor, identified in FIG. 2 as 16'. Thus, the current in conductor 16 needs to flow from point A to point B, wherein the current in conductors 16' needs to flow in the opposite direction from point C to point D, or vice versa. This arrangement can be obtained by positioning the power source 18 between point A and point D, while positioning the load 20 between point B and point C. An alternative would be to connect point B to point C, thereby connecting conductors 16 and 16' in series in the power circuit.

As seen in FIG. 2, in a preferred embodiment, trip unit 22 comprises a connecting rod 30 connected between bridging electrical contact means 12 and bridging electrical contact means 12'. Connecting rod 30 includes a necked down portion 32, which is designed to break when the opposing electromagnetic repulsive forces on bridging electrical contact means 12 and 12' exceed the tensile strength of this necked down portion 32. Note that electromagnetic repulsive forces are only useable in circuits of a high enough level of current. For lower level current overloads, mechanical forces must be used to break away said contact means 12 and 12' from respective conductors 16 and 16'.

Mechanical forces may also be used to assist electromagnetic forces in the separation of contact means 12 and 12' from conductors 16 and 16'. For example, rod 30 may function to retain hold the contacts 12 and 12' in tension against their respective conductors 16 and 16', thereby already generating a tension force on the necked down portion 32 of rod 30. Similarly, a spring 34 may be positioned in compression with respect to contacts 12 and 12', e.g., a helical spring positioned around the rod 30 as shown in FIG. 2, to provide an additional tension force against rod 30. A spring 34 would also provide a mechanical separation assistance for contact means 12 and 12' once rod 30 has broken, to continue the acceleration, and thereby the separation, of the contact means 12 and 12' away from their respective conductors 16 and 16'. A spring 34 may also provide means for preventing the contact means 12 from falling back and remaking contact with conductor 16. The force of gravity may also be used instead of, or in addition to spring 34 to assist in separating contact means 12 and or 12' from their respective conductors 16 and 16'.

Assuming, for example, that one could obtain a prestressed bridging electrical contact means 12 contact pressure against conductor 16 equal to 16 pounds, the following would result. In a power supply circuit of 700 volts and 50 kA under normal operation, if the desired trip point is 70 kA (40% over normal), then the magnetic repulsion forces that could be generated, if there were two oppositely flowing currents in adjacent conductors, would equal a force of 76 pounds, providing a total tensile force of 92 pounds on rod 30, the retaining means of trip unit 22. If the weight of the bridging electrical contact means 12 plus rod 30 is approximately 12 pounds, then an expected available acceleration would equal about 250 ft/sec$^2$. Thus, the distance which the contact means 12 would travel during 1 millisecond would be approximately 0.0015 inches. This first millisecond is needed to overcome the stretch and flexing in the conductor 16 bus bar due to the tension rod 30 contact force. Actual separation from the conductor 16 may require approximately 0.5 milliseconds more depending on the trip unit 22 mechanism chosen. Since the rate of rise of the current in overload is expected to be approximately 25 kA per millisecond, the current at this point may be nearly 10 kA.

By the time fast-acting fuse 24 blows, at a time set in this example of about 3.5 milliseconds after breaking of the bridging electrical contact means 12, the contact means 12 will be separated from the conductor 16 by about 0.02 inches, which is more than enough spacing to prevent arcing across gap 14. This is because the power supply voltage of 700 volts is only increased by 100 kA times the resistance of resistor 26. If resistor 26 had a resistance of 22 milliohms this would be about 2,200 volts. The voltage across gap 14 then declines to the maximum power supply voltage of 700 volts within the time constant of the power supply and feedlines, after approximately 4 milliseconds.

Figure 3:
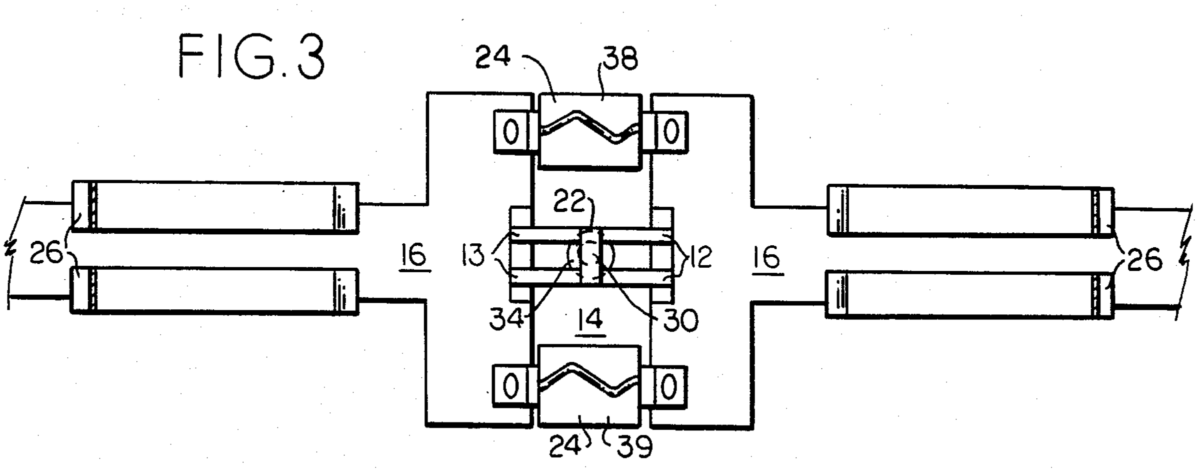
FIG. 3 is a top sectional view of the current limiting devices of FIG. 2 taken along the line 3—3 of FIG. 2.

FIG. 2 illustrates that each contact means 12 and 12' also includes a respective fuse in parallel across the conductor gap, with fuse 24 bridging gap 14 and fuse 24' bridging gap 14'. As seen in FIG. 3, which is a top view of the apparatus shown in FIG. 2, the bridging electrical contact means 12 may comprise a plurality of bridging elements 13, and each gap may be bridged by a plurality of fuses 24, identified as fuses 38 and 39 in FIG. 3. These fuses 38 and 39 are shown positioned in a preferred manner with respect to the bridging electrical contact means 12 to prevent any obstruction of said bridging elements 13 as they break away from conductor 16. Note that a plurality of fuses may be needed to maintain a given level of current for a specified time, as required, during a current overload state.

Referring again to FIG. 2, resistors 26 and 26', provide auxiliary resistance current paths for respective conductors 16 and 16'. In a preferred embodiment, to provide the necessary resistance for the resistors 26 and 26' and to provide the corresponding need for resistors that can absorb high current energy, a stainless steel or equivalent bus may be used. As seen, the resistors 26 and 26' are folded in an accordion like manner to provide the necessary length of conductor to obtain the necessary level of resistance in a limited space. As seen in FIG. 3, resistor 26 can also be split into two separate conductors, or more, in bridging a gap 14.

For example, as a rough guide approximately 10 pounds of metal is required for every megajoule of energy to be absorbed in the metal to prevent the metal from melting. Thus, if a resistance of 15 milliohms is needed to limit the current in the circuit, and assuming that a temperature rise of 300° F. is the maximum allowable, a steel conductor having a cross-sectional area of about 1.1 square inches and 50 feet long would be required. This might total 200 pounds of stainless steel. FIG. 2 also shows a plurality of conventional insulators 40 needed to provide strong, stable support for the apparatus. Insulators 40 should be good ceramic insulators. Insulators 40 also need to be strong enough to withstand the high compressive and tensile forces that may be generated during operation of the apparatus.

Figure 4:
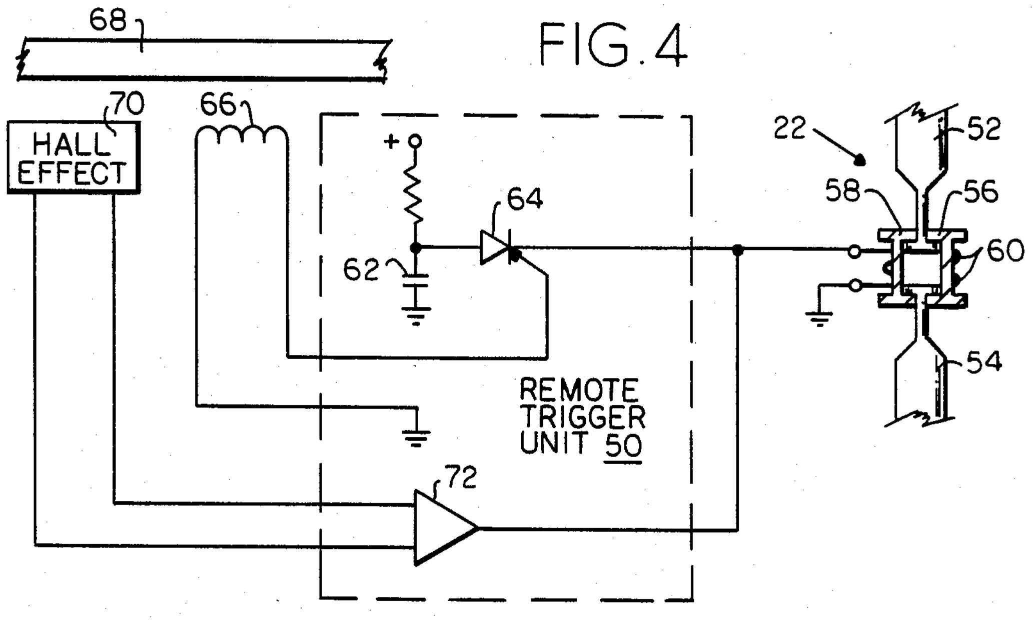
FIG. 4 illustrates a preferred embodiment of a remote current sensing trigger unit, and a preferred embodiment of a trip mechanism for the bridging electrical contacts according to the present invention.

FIG. 4 illustrates a preferred embodiment of a remote overcurrent sensing trigger unit 50 and a preferred embodiment of a trip mechanism 22 according to the present invention. As mentioned above, the trip mechanism may be of any type that will give fast release for the bridging electrical contact means 12, i.e. on the order of one millisecond or less, after initiation of a trigger signal. The trip mechanism 22 illustrated in FIG. 4 includes two rods 52 and 54 held together with segmented coupling rings 56 and 58. These coupling rings 56, 58 are joined by a fusible wire or squib 60 which is wound around rings 56 and 58. The fusible wire 60 is designed to be fused, and thus burned away, by a pulse from a trigger circuit within the time specified for fast release of the trip unit 22.

Although the above trip mechanism is one of the easiest to set up and provides means for breaking the bridging electrical contact means 12 in a repeatable manner, it should be understood that other similar mechanisms which would blow, melt, or trip a connecting link are also envisioned as the trip unit 22. Such devices would include a toggle clamp held in place by a fusible link, an electrically ignited explosive charge or squib, or other fast-acting magnetic, electric, solenoid or other releasing devices.

A remote trigger unit 50 may be used to provide the trip signal for the trip unit 22. Such a trigger unit 50 is designed as a sensing circuit to detect a short circuit before the current generated as a result thereof has had an opportunity to become excessive. The sensing circuit may also be designed to detect an excessive rate of change in the current even if the current does not reach an overload level.

To provide sufficient energy for fusing the fusible wire 60 within a millisecond, an electrolytic capacitor 62 may be used. Such a capacitor would charge up to about 150 volts, and when a conventional electronic switch 64 e.g. an SCR (Silicon Controlled Rectifier) is caused to conduct, a high voltage pulse would be coupled to the fusible wire 60, thereby burning away the wire within a millisecond. Once the wire 60 has been burned off, the forces acting against rods 52 and 54 would cause rods 52 and 54, along with contact means 12 and 12′ to rapidly separate from respective conductors 16 and 16′. Switch 64 could be turned on by a simple inductor or coil 66. Coil 66 operates to sense the magnetic field about an adjacent conductor 68, and to generate a pulse whenever current in conductor 68 exceeds the upper limit of a desired rate of change. An alternate circuit may use a conventional Hall effect device 70 which also senses the magnetic field generated about conductor 68, and develops an output voltage signal proportional, within certain ranges, to the magnetic field strength. The output of the Hall effect device 70 is fed into an amplifier 72 for generating the signal required to trigger the trip unit 22. A Hall effect device or other similar type of detector is more desirable in those situations wherein the rate of change of the current is too low to generate an adequate signal on a coil 66, but wherein an absolute maximum current has been exceeded. Of course other conventional types of current detectors would also be equally usable as a remote trigger unit 50 according to the present invention.

Figure 5:
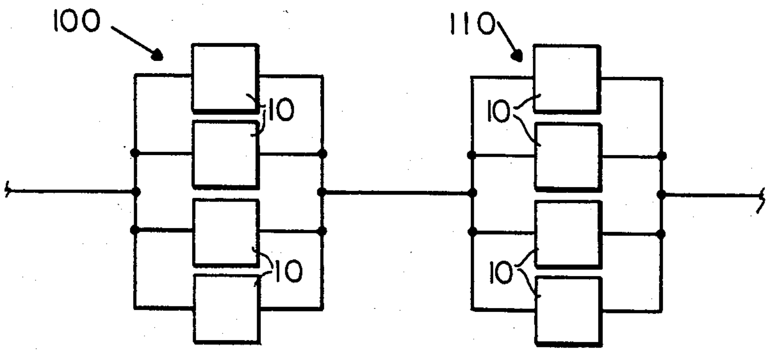
FIG. 5 illustrates a preferred embodiment of an array of current limiting devices according to the present invention.

FIG. 5 illustrates an array of current limiting devices 10 according to the present invention. Such an array is desirable for carrying higher peak currents than would otherwise be possible with conventionally or more easily sized components. FIG. 5 illustrates current limiting devices 10, in two subarrays 100 and 110 connected in series, with each subarray including four current limiting devices 10 connected in parallel. Such an array would be able to carry a peak current, for example, of approximately 500 kA or more during normal operation of the circuit and also capable of further limiting and or controlling the peak transient currents and voltages which can be generated during faults and subsequent operation of the current limiting devices.

It is to be understood that the foregoing description merely illustrates the preferred embodiments of the present invention, and that various modifications, alternatives and equivalents thereof will become apparent to those skilled in the art. Accordingly, the scope of the present invention should be defined by the appended claims and equivalents thereof.

What is claimed is:

1. A current limiting apparatus comprising:

bridging electrical contact means for forming a first current path across a gap in a conductor;

means for breaking said first current path in response to the current in said conductor exceeding a predetermined value, said breaking means comprising:

(i) means for retaining said bridging electrical contact means against said conductor in opposition to mechanical forces applied to said bridging electrical contact means, including connecting means connecting said bridging electrical contact means to a fixed point with respect to said conductor; and (ii) means for releasing said retaining means in response to current in said conductor exceeding a predetermined value, said mechanical forces causing in response thereto said bridging electrical contact means to break away from said conductor, said means for releasing said retaining means comprising a fusible wire means operatively attached to said connecting means such that when said fusible wire means is burned off, said connecting means separates from said fixed point, thereby enabling said bridging electrical contact means to break away from said conductor;

fast-acting fuse means connected to said conductor in parallel with said bridging electrical contact means, operative to maintain current in a second current path for a predetermined length of time after said first current path formed by said bridging electrical contact means is broken, such that said bridging electrical contact means has sufficient time to physically move away from said conductor to suppress arcing across said gap; and current limiting conductive means connected to said conductor in parallel with said bridging electrical contact means for providing a higher impedance third current path across said gap after said second current path formed by said fuse means is broken.

2. The current limiting apparatus of claim 1 wherein said means for releasing said retaining means includes trigger means comprising a coil positioned operatively adjacent said conductor remote from said bridging electrical contact means, electronic switch means, a capacitor operatively connected to said switch means, such that a signal generated in said coil by a current in said conductor causes said electronic switch means to switch on, said capacitor in response thereto, outputting a pulse to burn off said fusible wire means.

3. The current limiting apparatus of claim 1, wherein said means for releasing said retaining means includes trigger means comprising a Hall effect detector means positioned operatively adjacent said conductor remote from said bridging electrical contact means, for detecting the present current in said conductor, amplifier means for amplifying the output of said Hall effect detector means and for outputting a pulse to burn off said fusible wire means when said Hall effect detector means output indicates an overcurrent state.

4. A current limiting apparatus comprising:

first bridging electrical contact means for forming a first current path across a first gap in a conductor;

means for moving said first bridging electrical contact means away from said conductor to break said first current path across said first gap in response to the current in said conductor exceeding a predetermined value;

first fast-acting fuse means connected to said conductor in parallel with said first bridging electrical contact means, operative to maintain current in a second current path across said first gap for a predetermined length of time after said first current path formed by said first bridging electrical contact means is broken, such that said first bridging electrical contact means has sufficient time to physically move far enough away from said conductor to suppress or eliminate arcing across said first gap;

first current limiting conductive means connected to said conductor in parallel with said first bridging electrical contact means for providing a higher impedance third current path across said first gap after said second current path formed by said first fuse means is broken;

second bridging electrical contact means for forming a first current path across a second gap in said conductor formed in series with said first gap, wherein the current across said first gap is opposite in direction to the current across said second gap, wherein said means for moving said first bridging electrical contact means away from said conductor to break said first current path across said first gap includes means for moving said second bridging electrical contact means away from said conductor to break said first current path across said second gap in response to the current in said conductor exceeding a predetermined value, and wherein said means for moving said first and second bridging electrical contact means away from said conductor to break said first current path across said first gap and said second gap comprises a tension bar connected between said first and second bridging electrical contact means, said tension bar being operative to break apart when a predetermined level of electromagnetic repulsion forces on said first and second bridging electrical contact means has been exceeded, such that each said bridging electrical contact means is caused to break away from its respective said gap;

second fast-acting fuse means connected to said conductor in parallel with said second bridging electrical contact means operative to maintain current in a second current path across said second gap for a predetermined length of time after said first current path formed by said second bridging electrical contact means is broken, such that said second bridging electrical contact means has sufficient time to physically move far enough away from said conductor to suppress or eliminate arcing across said second gap; and second current limiting conductive means connected to said conductor in parallel with said second bridging electrical contact means for providing a higher impedance third current path across said second gap after said second current path formed by said second fuse means is broken.

* * * * *